US009489407B2

(12) United States Patent
Thuringer et al.

(10) Patent No.: US 9,489,407 B2
(45) Date of Patent: *Nov. 8, 2016

(54) SYSTEMS, METHODS, AND MACHINE-READABLE MEMORIES FOR PARTITIONING A DATABASE

(71) Applicant: ORACLE INTERNATIONAL CORPORATION, Redwood Shores, CA (US)

(72) Inventors: John Neil Thuringer, Middlesex (GB); Simon Jones, Reading (GB); Neil Bristow, Thatcham (GB); Ram Razdan, Middlesex (GB); Himavantha Rao Sajja, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 14/168,689

(22) Filed: Jan. 30, 2014

(65) Prior Publication Data

US 2014/0149460 A1    May 29, 2014

Related U.S. Application Data

(63) Continuation of application No. 12/114,532, filed on May 2, 2008, now Pat. No. 8,645,423.

(51) Int. Cl.
*G06F 17/30* (2006.01)
(52) U.S. Cl.
CPC ... *G06F 17/30312* (2013.01); *G06F 17/30306* (2013.01)
(58) Field of Classification Search
None
See application file for complete search history.

(56) References Cited

U.S. PATENT DOCUMENTS

| | | | |
|---|---|---|---|
| 5,315,657 | A | 5/1994 | Abadi et al. |
| 5,414,852 | A | 5/1995 | Kramer et al. |
| 5,787,427 | A | 7/1998 | Benantar et al. |
| 5,911,143 | A | 6/1999 | Deinhart et al. |
| 6,023,765 | A | 2/2000 | Kuhn |
| 6,038,563 | A | 3/2000 | Bapat et al. |
| 6,085,191 | A | 7/2000 | Fisher et al. |

(Continued)

OTHER PUBLICATIONS

Author Unknown, "Role-Based Access Control", Wikipedia, Retrieved from http://en.Wikipedia.org//wiki/Role-based_access_control printed on Nov. 20, 2009, 4 pages.

(Continued)

*Primary Examiner* — Richard Bowen
(74) *Attorney, Agent, or Firm* — Kilpatrick Townsend & Stockton LLP

(57) ABSTRACT

Systems, methods, and machine-readable memories are provided for partitioning a multi-tenant database between tenants. A first level partition of data in a table within the database is defined. A second level partition of the data in the table within the database is defined. A request is received from an entity associated with a tenant to access a first datum stored in the database. The tenant is determined to be assigned to one or both of the first level partition and the second level partition. Access to the first datum is granted to a first entity where the tenant corresponds to the first tenant and the first datum corresponds to the first level partition parameter value. Access to the first datum is granted to a second entity where the tenant corresponds to the second tenant and the first datum corresponds to the second level partition parameter value.

17 Claims, 8 Drawing Sheets

(56) References Cited

U.S. PATENT DOCUMENTS

| | | |
|---|---|---|
| 6,212,511 B1 | 4/2001 | Fisher et al. |
| 6,237,099 B1 | 5/2001 | Kurokawa |
| 6,292,798 B1 | 9/2001 | Dockter et al. |
| 6,308,273 B1 | 10/2001 | Goertzel et al. |
| 6,516,315 B1 | 2/2003 | Gupta |
| 6,748,536 B1 | 6/2004 | Madau |
| 6,886,012 B1* | 4/2005 | Phoenix ............ G06F 17/30336 707/704 |
| 6,954,220 B1 | 10/2005 | Bowman-Amuah |
| 6,990,492 B2 | 1/2006 | Gupta |
| 7,013,485 B2 | 3/2006 | Brown et al. |
| 7,051,196 B2 | 5/2006 | Angelo et al. |
| 7,068,789 B2 | 6/2006 | Huitema et al. |
| 7,124,192 B2 | 10/2006 | High et al. |
| 7,127,501 B1 | 10/2006 | Beir et al. |
| 7,213,262 B1 | 5/2007 | Elley et al. |
| 7,461,158 B2 | 12/2008 | Rider et al. |
| 7,546,629 B2 | 6/2009 | Albert et al. |
| 7,664,751 B2 | 2/2010 | O'Sullivan et al. |
| 7,711,750 B1 | 5/2010 | Dutta et al. |
| 8,645,423 B2 | 2/2014 | Thuringer et al. |
| 2001/0036224 A1 | 11/2001 | Demello et al. |
| 2002/0129274 A1 | 9/2002 | Baskey et al. |
| 2003/0177389 A1 | 9/2003 | Albert et al. |
| 2004/0162853 A1 | 8/2004 | Brodersen et al. |
| 2005/0197859 A1 | 9/2005 | Wilson et al. |
| 2006/0053194 A1 | 3/2006 | Schneider et al. |
| 2006/0074913 A1 | 4/2006 | O'Sullivan et al. |
| 2006/0106998 A1* | 5/2006 | Kalos ................... G06F 3/0605 711/152 |
| 2006/0173932 A1 | 8/2006 | Cortright et al. |
| 2006/0173999 A1 | 8/2006 | Rider et al. |
| 2007/0006322 A1 | 1/2007 | Karimzadeh et al. |
| 2007/0094716 A1 | 4/2007 | Farino et al. |
| 2007/0130130 A1* | 6/2007 | Chan ................. G06F 17/30477 |
| 2007/0165859 A1 | 7/2007 | Scheidt et al. |
| 2007/0192323 A1 | 8/2007 | Miller |
| 2008/0016580 A1 | 1/2008 | Dixit et al. |
| 2008/0022389 A1 | 1/2008 | Calcev et al. |
| 2008/0109362 A1 | 5/2008 | Fransdonk |
| 2008/0229211 A1 | 9/2008 | Herberger et al. |
| 2009/0013141 A1 | 1/2009 | Kinoshita |
| 2009/0183184 A1 | 7/2009 | Nadalin et al. |
| 2010/0180029 A1* | 7/2010 | Fourman ........... G06F 17/30867 709/225 |
| 2010/0228894 A1 | 9/2010 | Strulovici et al. |

OTHER PUBLICATIONS

Examination Opinion for Application No. GB0907500.3 dated on Aug. 3, 2009; 2 pages.

Fernandez, R., "Enterprise Dynamic Access Control Version 2 Overview", U.S. Navy Technical Document, Jan. 2006, pp. 35-43.

Fernandez, R., "Secure Enterprise Access Control (SEAC) Role Based Access Control (RBAC)," Jun. 2004, U.S. Navy Technical Document No. 3182, pp. I, 11-15.

Ferraiolo, et al., "Role-Based Access Controls", Proceedings of the 15th NIST-NSA National Computer Security Conference, 1992.

Jajodia, S. et al., "Flexible Support for Multiple Access Control Policies," ACM Transactions on Database Systems, ACM, vol. 26, No. 2, pp. 214-228.

Sandhu, et al., "Role-Based Access Control Models", Feb. 1996, IEEE Computer, vol. 29, No. 2, p. 38-47.

Schaad, et al, "The Role-Based Access Control System of a European Bank: A Case Study and Discussion," ACM, SACMAT 2001: 6th ACM Symposium on Access Control Models and Technologies, Chantilly, VA, USA 2001, 8 pages.

* cited by examiner

SYSTEMS, METHODS, AND MACHINE-READABLE MEMORIES FOR PARTITIONING A DATABASE

CROSS-REFERENCES TO RELATED APPLICATIONS

The present application is a continuation of U.S. patent application Ser. No. 12/114,532 filed May 5, 2008, entitled "A Method of Partitioning A Database," the entire contents of which are incorporated herein by reference for all purposes.

BACKGROUND OF THE INVENTION

Field of the Invention

The present invention is in the field of database systems. In particular, the present invention provides a method of partitioning data within a database.

Description of the Related Art

"Software as a service" refers to a method of allowing users to access software applications as-and-when they are required through distributed networks such as the Internet. This alleviates the need for software to be installed and licensed on particular computer systems within an organisation and typically allows access to advanced features through a "web interface" or HTML (HyperText Markup Language) page that can be accessed using an Internet browser such as Internet Explorer™ from Microsoft Corporation or Firefox™ from Mozilla Foundation.

The hardware needed to implement a "software as a service" system typically comprises a central computer system operating as an application server. The application server implements the "web interface" and handles incoming user requests and communications. The application server allows a user to access and process appropriate data. This data is typically stored within a database operably connected to the application server.

In certain situations, the application server is required to supply a particular application to multiple departments of a particular organisation. For example, a software provider may need to provide an employee management application to multiple departments of a large multi-national company. Alternatively, a software provider may need to provide an application to different legal entities that are collectively part of a larger parent company. In these situations data related to the organisation is typically stored within a single database to which all departments have access.

In other situations, the application server is required to supply a particular application, or collection of customised applications, to multiple organisations. For example, a software provider may need to provide a payroll application to a number of entities, including government departments, small businesses and large corporations. This ability to service multiple customers using a single application instance, typically with the same database, is referred to as "multi-tenancy". By providing multi-tenancy a software provider is able to invest in central infrastructure and reduce the cost of supplying software applications to customers. Multi-tenancy also allows maintenance and upgrades to be performed centrally for all customers using the application.

However, implementing such software applications also generates numerous problems that need to be addressed. Applications that support multiple departments or multi-tenancy have to provide the ability of partitioning their data for security purposes. This ensures, for example, that a human resources administrator of one company cannot access data concerning employees of another company whilst being provided with the same payroll application; even though both companies' data will be accessed by a single application server providing the same payroll application.

In the prior art, some application providers have attempted to provide this security by partitioning the data within the database by company or organisation. In this solution, a user can only access data assigned to his/her organisation's partition. However, this solution requires application data that is common to a plurality of organisations, for example, data concerning national legal requirements, to be replicated for each partition. Similar problems also occur for related partitioning schemes that partition data along national boundaries. Such solutions often lead to consistency and redundancy problems, as well as requiring more storage space.

Additionally, large organisations today are typically a complex set of structures (e.g. a corporation may be a conglomerate of smaller companies), that often span multiple countries and conduct many different types of activities subject to different laws. Such organisations may not fit into the simple mould used by prior art partitioning methods and may require complex separation of certain data. For example, an organisation may employ staff that move around European offices under free movement of labour agreements; in such a case a manager may need to access data concerning a team of employees that branch geographic and legal boundaries.

Hence there is a requirement in the art to provide a well defined architecture for partitioning data to support requirements of the modern world, i.e. multi-tenancy, multi-national organisations and multiple levels of partitioning. Existing solutions provide limited solutions that are unsuitable for complex organisations.

BRIEF SUMMARY OF THE INVENTION

According to a first aspect of the present invention there is provided a method of partitioning data in a database, the database configured to be accessed by an entity, the method comprising:

defining a first partition within the database;

defining a second partition within the database; and assigning a first set of data in the database to the first partition and the second partition, wherein data assigned to both the first partition and the second partition may only be accessed by an entity assigned to both said first partition and said second partition.

The present invention thus allows multi-level partitions and advanced control of data access. The present invention achieves this by defining the interaction or intersection of two partitions in a manner that is not to be found in the prior art.

In one embodiment the method further comprises assigning a second set of data to one of: no partitions, solely the first partition, solely the second partition or both the first and second partition; and assigning an entity requiring access to the database to one of: no partitions, solely the first partition, solely the second partition or both the first and second partition, wherein an entity assigned to both the first and second partitions may access data solely assigned to either the first or second partitions. In certain embodiments, data that is not assigned to a first partition or a second partition may be accessed by all entities.

According to the present invention, in order for an entity to have access to data assigned to a specific partition, it must have that specific partition assigned to it. Likewise, if data has been assigned to a plurality of partitions, an entity must have been assigned the exact same plurality of partitions in order to gain access. The entity may be one of a user or an application.

The first partition may represent one of: an organisation, a region, a legal grouping, a business unit, or a legal entity; and the second partition may represent another of: an organisation, a region, a legal grouping, a business unit, or a legal entity.

In another embodiment of the present invention the first defining step of the method of the first aspect comprises adding one or more columns to one or more data tables within the database; and the second defining step of the method of the first aspect comprises, for one or more rows within a selected data table within the database, adding one or more entries to the one or more columns, each entry denoting a different partition to which the data is assigned.

Preferably, the method further comprises defining one or more further partitions within the database; and assigning the first set of data in the database to each of the one or more further partitions, wherein data assigned to a plurality of partitions may only be accessed by an entity correspondingly assigned to said plurality of partitions.

According to a second aspect of the present invention there is provided a method of accessing partitioned data within a database, the method comprising:
receiving a request for access to particular data within the database from an entity;
determining whether the data is assigned to a first partition;
determining whether the data is assigned to a second partition;
determining whether the entity is assigned to a first partition; and
determining whether the entity is assigned to a second partition;
if the data is assigned to a first partition and a second partition, conditionally granting the entity access to the data if the first partition assigned to the data matches a first partition assigned to the entity and the second partition assigned to the data matches a second partition assigned to the entity.

In one embodiment of the second aspect the method further comprises, if the data is not assigned to any partitions, conditionally granting the entity access to said data.

According to a third aspect of the present invention there is provided a method of accessing partitioned data in a database comprising:
receiving a request for access to the database from an entity, the request comprising an entity reference;
determining whether the entity is assigned to any partitions of the database based on the entity reference; and
filtering the data within the database so that data assigned to a first partition and a second partition may only be accessed by an entity assigned to said first partition and said second partition.

In one embodiment of the third aspect, the step of filtering the data within the database further comprises filtering the data so that an entity assigned to both the first partition and the second partition can access data assigned solely to the first partition or solely to the second partition.

Preferably, an entity can only view filtered data and/or the request further comprises security data and the method further comprises validating the request for access based on the entity reference and the security data.

In a variation of the third aspect, if the data is only assigned to a single partition, the method may further comprise:
selecting data from the filtered data accessible to the entity, wherein the filtered data comprises data assigned solely to a single pre-assigned partition, said single pre-assigned
partition also being assigned to the entity;
generating a third partition; and
assigning the selected data to said pre-assigned partition and said third partition.

In another variation the first partition represents one of: an organisation, a region, a legal grouping, a business unit, or a legal entity; and the second partition represents another of: an organisation, a region, a legal grouping, a business unit, or a legal entity.

According to a fourth aspect of the present invention there is provided a data structure for partitioning data within a database comprising:
one or more data tables comprising one or more entries, each entry comprising a set of data; and
for each entry in said one or more data tables:
a first partition parameter for assigning the set of data to a first partition;
a second partition parameter for assigning the set of data to a second partition.

Such a data structure allows multi-level and multi-tenancy data partitions that are not to be found in the prior art. Moreover, by providing each entry or data item in the table with two partition parameters a plurality of different partitioning configurations may be enacted.

In one embodiment of the fourth aspect the data structure further comprises one or more entity tables comprising one or more entries, each entry comprising a set of data related to a particular entity; and for each entry in said one or more entity tables:
a first partition parameter for assigning the entity to a first partition;
a second partition parameter for assigning the entity to a second partition.

In another embodiment the data structure preferably comprises, for each entry in said one or more data tables, one or more partition parameters for assigning the set of data to one or more further partitions; and for each entry in said one or more entity tables, one or more partition parameters for assigning the entity to one or more further partitions.

In selected embodiments, each partition parameter of the fourth aspect may be assigned a null value representing the case where the set of data or the entity is not assigned to a particular partition. In other embodiments the first partition represents one of: an organisation, a region, a legal grouping, a business unit, or a legal entity; and the second partition represents another of: an organisation, a region, a legal grouping, a business unit, or a legal entity.

Preferably, the data structure further comprises a configuration table comprising one or more entries, each entry corresponding to a value to be assigned to one or more of the first partition parameter and the second partition parameter.

According to a fifth aspect of the present invention there is provided a computer readable storage medium storing instructions that, when executed by a computer, cause the computer to perform the method of any one of the second to fourth aspects of the invention.

BRIEF DESCRIPTION OF THE DRAWINGS

Embodiments of the present invention will now be described by way of example with reference to the accompanying drawings, in which.

DETAILED DESCRIPTION OF THE INVENTION

According to a preferred embodiment of the present invention, an application provider is provided with a well defined architecture for partitioning associated data. Such an architecture allows multi-tenancy, and multiple levels of partitioning and supports multinational organisations.

Figure 1A:
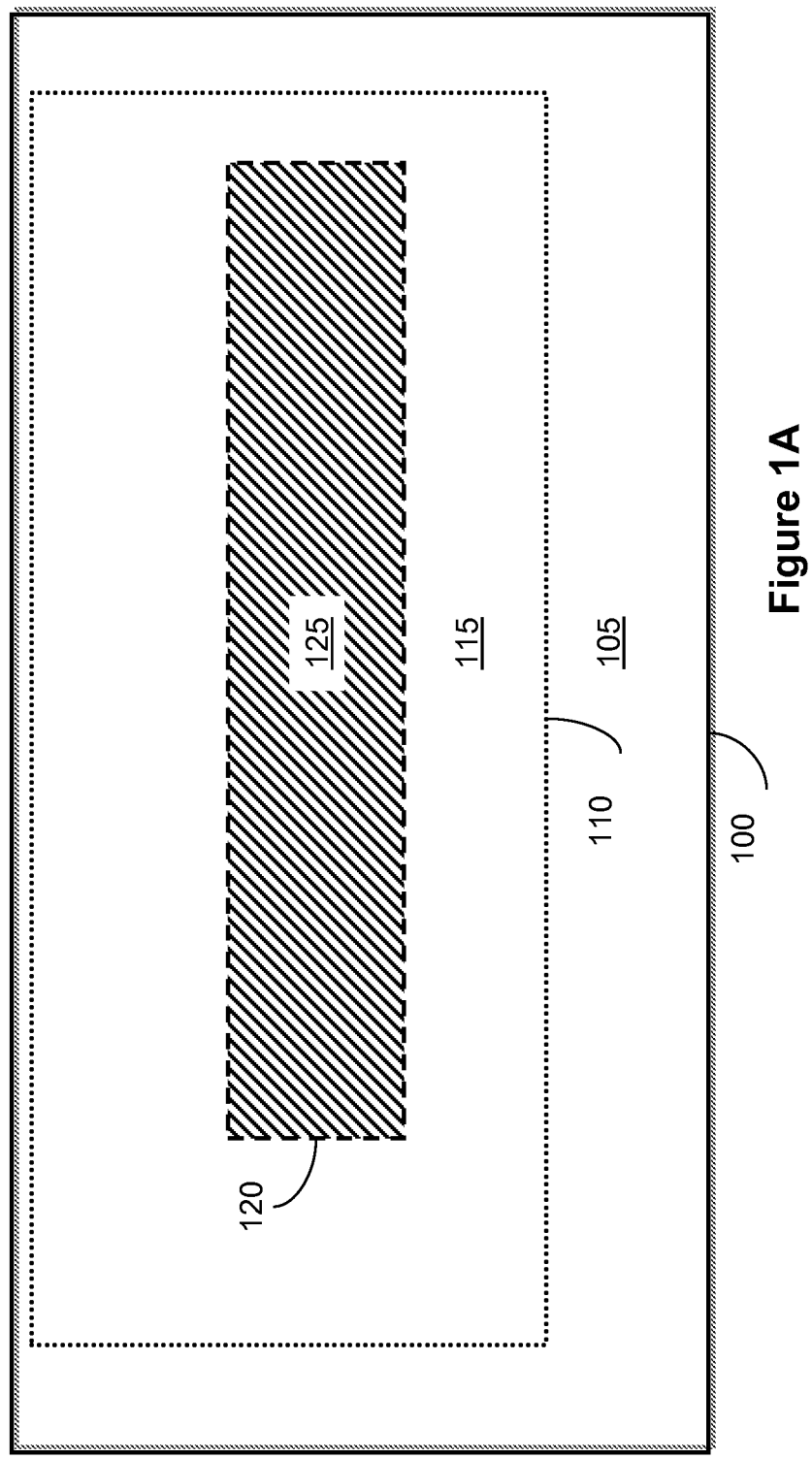
FIG. 1A schematically illustrates a first partitioning structure according to a first embodiment of the present invention.

FIG. 1A schematically illustrates data within a database 100 that has been partitioned according to a first embodiment of the present invention. A first partition 110 partitions a subset of data, as illustrated by the dotted line. Data may be assigned to the first partition 110 by associating a first partition parameter with the data and then configuring the value of this parameter accordingly. For example, the table below represents a data table stored within a database:

TABLE 1

| DATA_ID | DATA |
|---------|------|
| 001 | XYZ |
| 002 | ABC |
| 003 | OPQ |

Each row or entry in the table represents a different set of data, for example the third row stores a primary key (DATA_ID) and a data attribute (DATA). In a preferred embodiment, a first partition parameter is associated with the data by adding a column to the data table to store a first partition parameter value (FPP_VALUE) for each row, for example:

TABLE 2

| DATA_ID | DATA | FPP_VALUE |
|---------|------|-----------|
| 001 | XYZ | 1 |
| 002 | ABC | null |
| 003 | OPQ | 1 |

In this example, data entries XYZ and OPQ are assigned to the first partition 110, as represented by data 115 in FIG. 1A, and data entry ABC is not assigned to any partition, as represented by data 105 in FIG. 1A. In this example, as there is only one first partition the FPP_VALUE is a Boolean value. In this and other examples of the first embodiment the entry "1" represents a Boolean "true" value. Data is not assigned to a partition if the parameter value comprises a null value, although the structure can also be configured to use a value of 0 instead of a null value.

FIG. 1A also shows a second partition 120. This partition has been created within the first partition 110. To assign data within the database to the second partition 120 a second partition parameter can be used. This parameter may be assigned to the data in a similar manner to the assignation of the first partition parameter, i.e. by adding a second partition parameter (SPP_VALUE) column to the data table shown in Table 2 as shown below:

TABLE 3

| DATA_ID | DATA | FPP_VALUE | SPP_VALUE |
|---------|------|-----------|-----------|
| 001 | XYZ | 1 | 1 |
| 002 | ABC | null | null |
| 003 | OPQ | 1 | null |

In this example, data entry XYZ is assigned to both the first partition and the second partition (as represented by data 125), data entry OPQ is assigned to the first partition only (as represented by data 115) and data entry ABC is not assigned to a partition (as represented by data 105). As before, as there is only a single second partition in FIG. 1A the SPP_VALUE may be Boolean; however, the first embodiment can be adapted to function with multiple mutually exclusive first and second partitions, in which case the first and second partition parameter values may be respectively selected from a set of known first partition and second partition names. For example, there may be a I second partition and a II second partition; in this case the SPP_VALUE will be I, II or the null value.

Figure 1B:
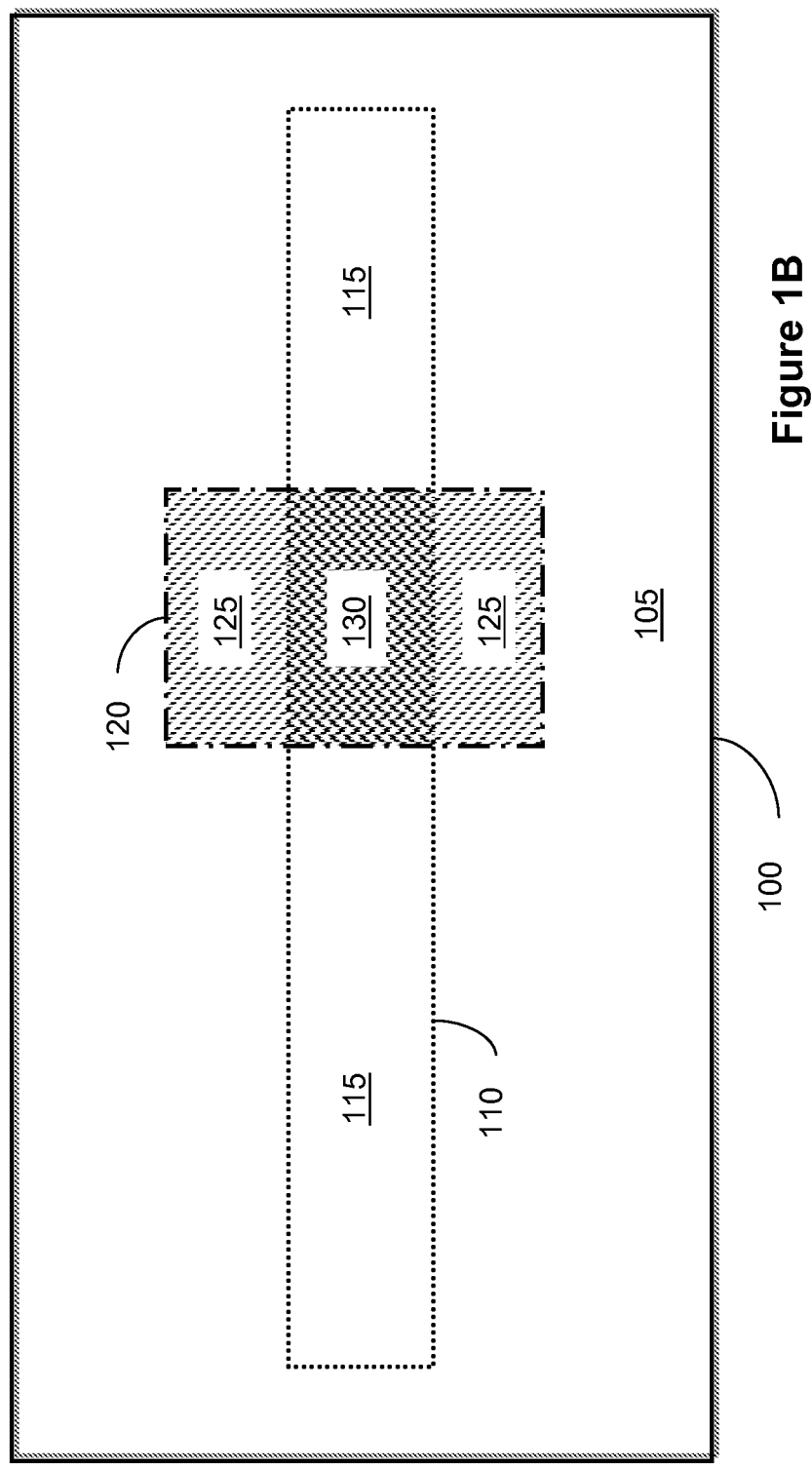
FIG. 1B schematically illustrates a second partitioning structure according to a first embodiment of the present invention.

Another example of partitioning according to the first embodiment of the present invention is shown in FIG. 1B. In this example there are two overlapping partitions: a first partition 110 and a second partition 120. Again, the partitions may be defined using a table similar to that of Table 3 as shown below:

TABLE 4

| DATA_ID | DATA | FPP_VALUE | SPP_VALUE |
|---------|------|-----------|-----------|
| 001 | XYZ | 1 | 1 |
| 002 | ABC | null | null |
| 003 | OPQ | 1 | null |
| 004 | STU | null | 1 |

In this example, data entry STU is assigned to the second partition 120 but is not assigned to the first partition 110 (as represented by data 125), data entry XYZ is assigned to both the first partition 110 and the second partition 120 (as represented by data 130), data entry OPQ is assigned to the first partition 110 only (as represented by data 115), and data entry ABC is not assigned to a partition (as represented by data 105).

Figure 1C:
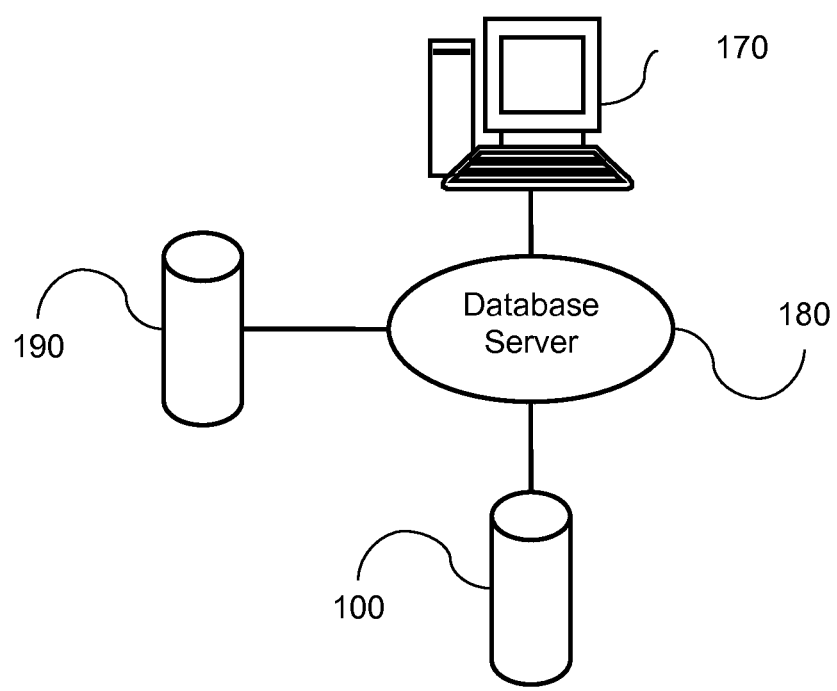
FIG. 1C schematically illustrates a hardware configuration for implementing the first embodiment of the present invention.

A system for accessing the data of database 100 is shown in FIG. 1C. This system comprises a computer 170, which may be a client or server computer equipped with a processor and memory and adapted to process program code stored in memory. The computer 170 is operably connected to database 100. Database 100 may be implemented upon any conventional local, remote or distributed storage device. Computer 170 is adapted to communicate with a database server 180. Database server 180 may comprise an application implemented by program code that is processed by a processor of client computer 170 or may be an application running on a remote system. Database server 180 is operably connected to an entity database 190. Entity database comprises a database containing data related to all entities that require access to database 100. An entity may be a user or an application. Entity database 190 may be implemented upon the same storage device as database 100 or on a different storage device. In certain embodiments entity database 190 may form part of database 100.

An example of data stored within the entity database 190 is shown below:

TABLE 5

| ENTITY_ID | P_WORD | FPP_VALUE | SPP_VALUE |
|---|---|---|---|
| U_1 | **** | 1 | 1 |
| U_2 | **** | null | null |
| U_3 | **** | 1 | null |
| U_4 | **** | null | 1 |
| A_1 | **** | 1 | 1 |

As can be seen, the entity database contains one or more entity tables comprising a number of rows or entries containing entity data. This entity data comprises, entity identifier (ENTITY_ID), security attributes (P_WORD), and a first and second partition parameter (FPP_VALUE, SPP_VALUE). The present entity table is configured to access data partitioned according to the second example of the first embodiment shown in FIG. 1B; however, it can also be used to access data partitioned according to the first example of the first embodiment shown in FIG. 1A.

An example of a method of accessing data partitioned according to the first embodiment will now be described with reference to the system of FIG. 1C and the entity table shown in Table 5. A user operating computer 170 first makes a request to the database server 180 to access data on the database 100. This request may comprise sending an entity reference, such as ENTITY_ID shown above, together with security data, such as P_WORD. The database server 180 then verifies the user's identity by checking that the supplied entity reference refers to an entry in the entity table and then by checking whether the supplied security details match those stored in the entity table. If the user provides the correct details the database server 180 then examines the remaining details of the request for access to data within database to determine whether access should be allowed.

In the present example, a request for access to data within the database may take one of two forms: one, a request for specific data to be retrieved from the database 100; or two, a request for general rights to view data within the database 100.

Figure 2A:
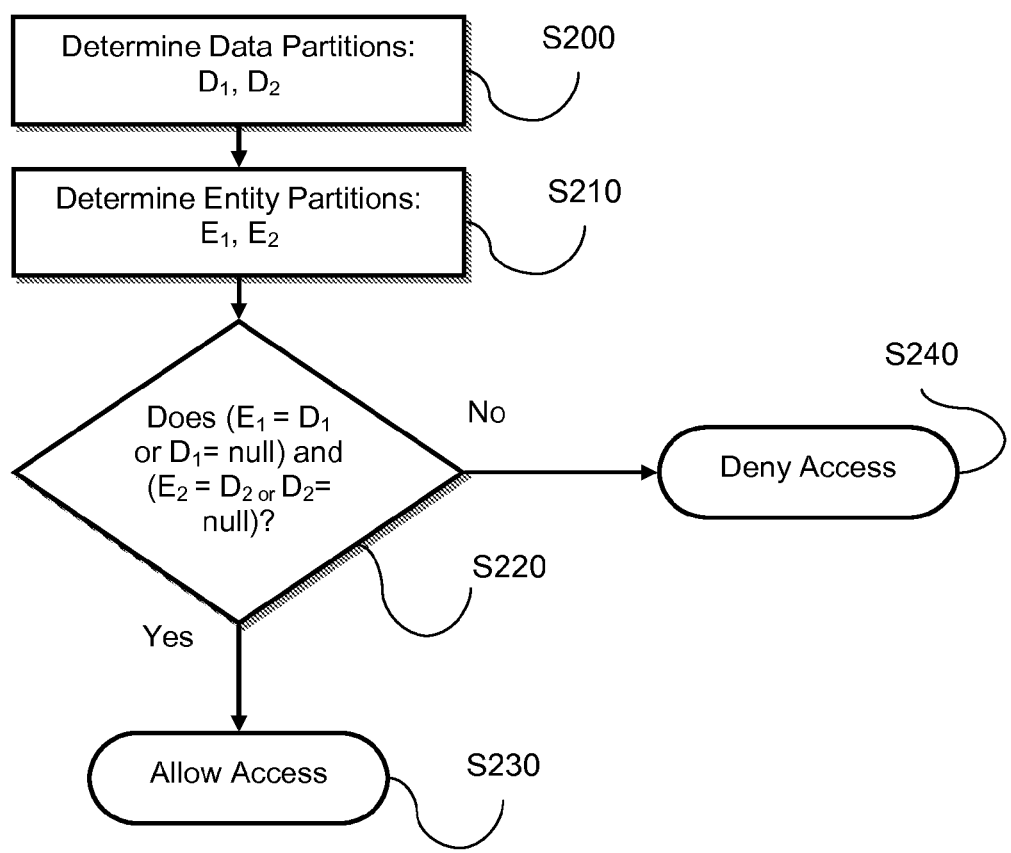
FIG. 2A illustrates a first exemplary method of accessing data according to a first embodiment of the present invention.

The first method of data access is shown in FIG. 2A. Before the method begins the database server 180 first determines a data reference based on the request for access to data received from the user. This may be the DATA_ID field or a reference to this field (for example, a DATA field entry). The database server 180 then determines which partitions, if any, the requested data is assigned to by looking up the values of the first and second partition parameters (D1, D2) associated with the DATA_ID at step S200. For example, if the user requests access to data XYZ then the database server 180 determines that this data is assigned to the first partition 110 and the second partition 120 (e.g. D1=1 and D2=1). The database server 180 then determines the permissions assigned to the user by looking up the values of the first and second partition parameters (E1, E2) associated with the user's ENTITY_ID at step S210.

At step S220 the database server 180 determines whether the entity can access the data by determining whether (E1=D1 or D1=null) and (E2=D2 or D2=null). If the data is universal data available to all, i.e. the data is not assigned to any partitions—D1=D2=null, then access to the data is allowed at step S230. If the data is assigned to one or more partitions then the database server 180 determines if the partitions assigned to the entity match the partitions assigned to the data (i.e. E1=D1, E2=D2), wherein a "null" data value acts as a wildcard. If there is a match then access to the data is granted at step S230; if these conditions are not fulfilled then access is denied at step S240.

Using the data table of Table 4 and the entity data of Table 5 as examples, the above method produces the following results: If the entity is assigned solely to the first partition e.g. is user U_3, and the data 115 is assigned solely to the first partition or is universal data 105 (as in the case of data OPQ or ABC) then the entity is allowed access to the requested data item. However, user U 3 cannot access data 125 solely assigned to the second partition or data 130 assigned to both the first and second partitions. If the entity is assigned to the first partition and a second partition, e.g. is user U_1 or application A_1, and the data 130 is assigned to the first partition 110 and the second partition 120 (as in the case of data XYZ) then the entity is allowed access to the requested data item (e.g. can retrieve data XYZ or data stored in other columns of row 001 in Table 4). An entity assigned to both the first and second partitions is also able to access any data 115 solely assigned to the first partition or data 125 solely assigned to the second partition or universal data (i.e. U_1 or A_1 can access all the data in Table 4). If the entity is assigned to solely the second partition, e.g. is user U_4, then the entity is able to access data 125 solely assigned to the second partition and universal data 105 (e.g. data STU and ABC) but cannot access data 115 solely assigned to the first partition or data 130 assigned to both the first and second partitions. User U_2 can only access universal data 105 (i.e. data ABC).

Figure 2B:
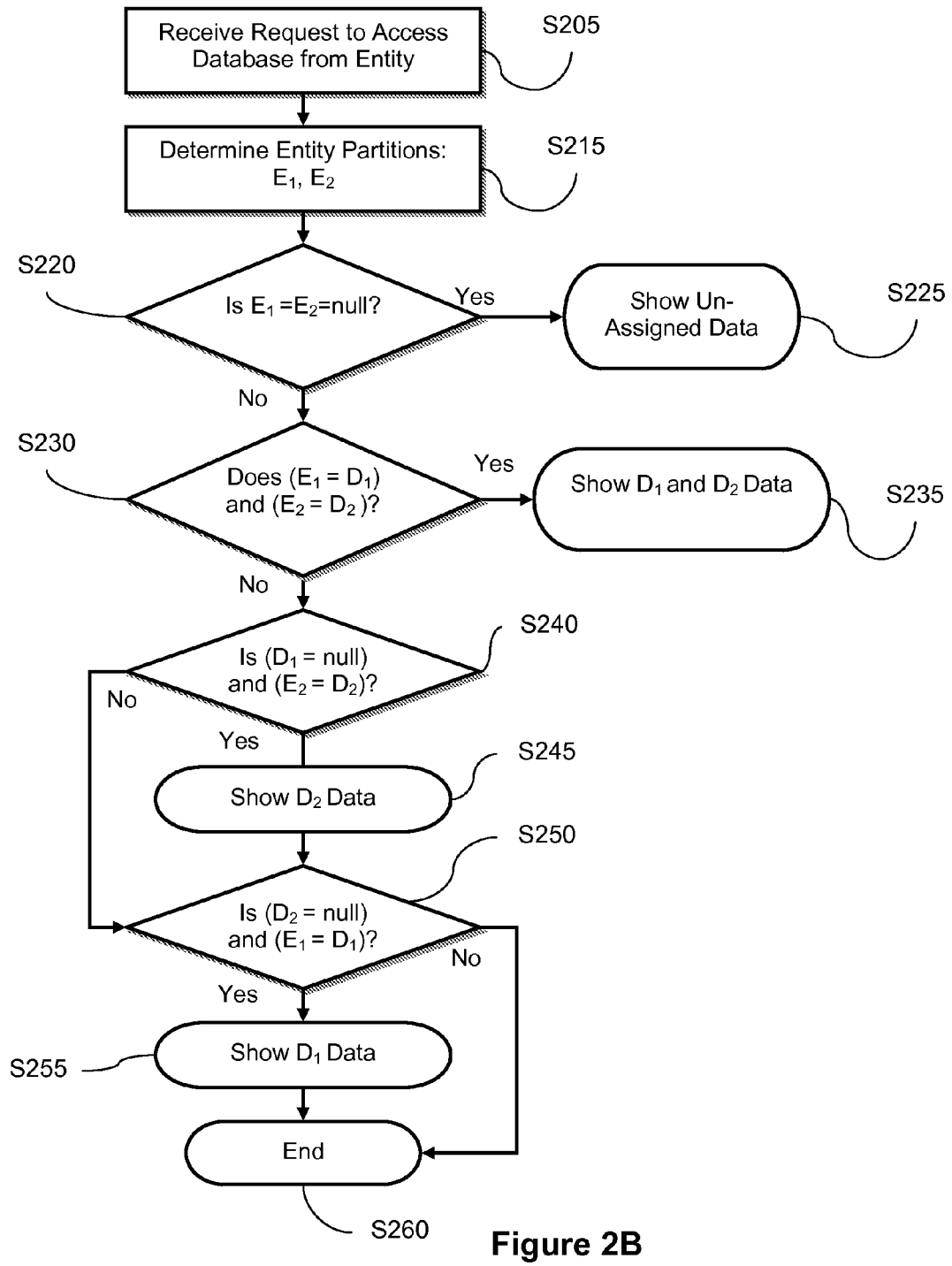
FIG. 2B illustrates a second exemplary method of accessing data according to a first embodiment of the present invention.

The second method of data access is shown in FIG. 2B. At step S205 database server 180 receives a request from an entity (user or application) to access the database. This may be in the form of a "log on" command As in the first method, the entity is validated by checking their credentials against the entity data in the entity table. At step S215 the entity partition parameters are retrieved from the entity table. At step S220 a check is made to see whether the entity is assigned to one or more partitions. If this is not so, the data is filtered at step S225 so as to only allow access to universal data.

If the entity is assigned to one or more partitions the method proceeds to step S230. At this step a check is made to see whether the plurality of partitions assigned to the entity match one or more partitions in the database. On the basis of this comparison the entity is allowed access to data assigned to matching partitions at step S235.

Steps S240 to S255 are optional and provide the wildcard functionality of the "null" value, i.e. allow data with a "null" parameter value to be accessed by an entity with a non-matching parameter value. At step S240 a check is made to see whether any data in the database has a "null" value for the first parameter value and then a match is made to equate the entity second partition parameter to a data second partition parameter (i.e. does (D1=null) and (E2=D2)); data that does have a "null" FPP_VALUE and that has a SPP_VALUE that matches the entity's second parameter value is provided to the entity requiring access at step S245. Similarly, at step S250 a check is made to see whether any data in the database has a "null" value for the second parameter value and then a match is made to equate the entity first partition parameter to a data first partition parameter (i.e. does (D2=null) and (E1 =D1)); data that does have a "null" SPP_VALUE and that has a FPP_VALUE that matches the entity's first parameter value is provided to the entity requiring access at step S255. At step S260 the method ends.

Using the data table of Table 4 and the entity data of Table 5 as examples, the above method produces the following results: The user U_2 is shown and able to access only data ABC shown in Table 4. User U_1 and application A_1 are presented with all the data in Table 4. The user U_3 is presented with the following data:

TABLE 6

| DATA_ID | DATA | FPP_VALUE | SPP_VALUE |
|---------|------|-----------|-----------|
| 002 | ABC | null | null |
| 003 | OPQ | 1 | null |

User U_4 is presented with:

TABLE 7

| DATA_ID | DATA | FPP_VALUE | SPP_VALUE |
|---------|------|-----------|-----------|
| 002 | ABC | null | null |
| 004 | STU | null | 1 |

Hence, the present invention, as described with reference to the first embodiment allows data within a database to be partitioned in a multi-level manner. For example, data 115 solely assigned to the first partition (e.g. OPQ) may represent data relating to a large organisation that can be accessed by employees of the organisation and data 125 solely assigned to the second partition may represent data relating to a geographical region that can be accessed by users based in said region. The operations of the organisation in the geographical region may have data, such as data 130, that is only accessible by users or applications assigned both to the organisation and the region.

A second embodiment of the present invention will now be described with reference to FIGS. 3 to 5. This embodiment uses the partitioning methods and structures of the first embodiment to provide a complex partitioned database for use in multi-tenancy systems.

Figure 3:
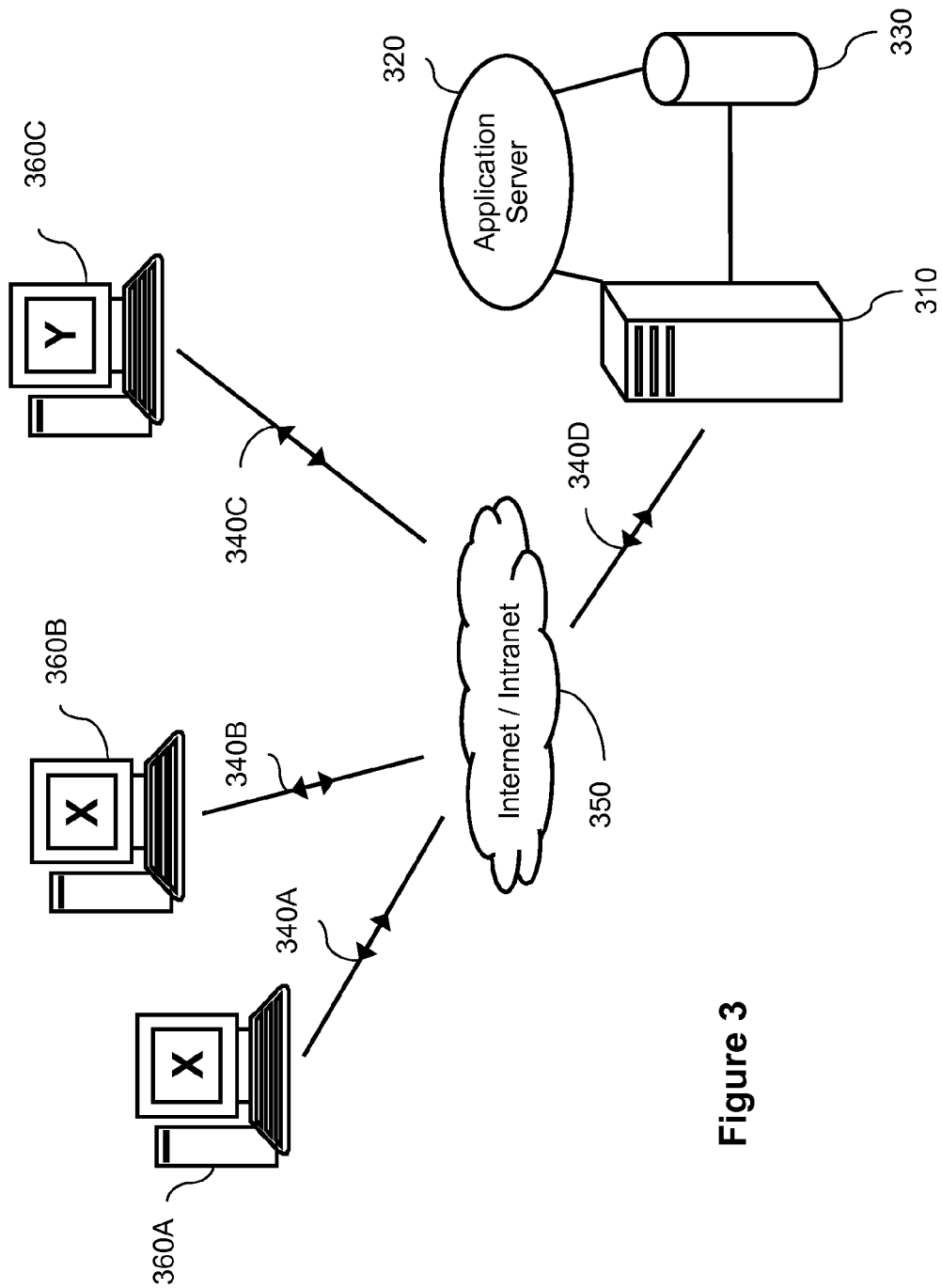
FIG. 3 schematically illustrates a network arrangement for use with a second embodiment of the present invention.

FIG. 3 illustrates a schematic network arrangement for use with the second embodiment of the present invention. The arrangement builds on the arrangement shown in FIG. 1C to encompass multiple networked computers. The arrangement comprises a server computer 310 connected to a network 350 through network connection 340D. The network may be any one of a Local Area Network (LAN), a Wide Area Network (WAN), or a mixture of network types, such as the Internet. The network may use a common high level protocol, such as TCP/IP, and/or may comprise a number of networks utilising different protocols connected together using appropriate gateway systems. The network connections 340 may be wired or wireless and may also be implemented using any known protocol.

The server computer 310 comprises a processor adapted to run program code that implements application server 320. Application server 320 is responsible for providing an application interface to users. The application interface enables users to access one or more application instances that allow the user to view and manipulate data. In use, application server 320 accesses data within database 330 to provide said functionality to one or more users. Database 330 is implemented upon a storage device. The storage device may comprise a single device or a collection of devices, such as a RAID (Redundant Array of Independent Disks) array. The storage device may form part of the server computer 310 or may be operably connected to the server computer 310.

The application server 320 typically receives commands from a number of users (or entities) operating a number of client computers 360. In the present example, client computers 360A and 360B are used by members of organisation X whereas client computer 360C is used by a member of organisation Y. Each of client computers 360A, 360B and 360C communicate with the server computer 310 across network 350. The client computers may be connected to the network 350 by any connection protocol or method known in the art. In other embodiments the server computer 310 may be connected to one or more remote clients or servers, these remote systems may run software applications (entities) configured to access services and data provided by the application server 320.

Figure 4:
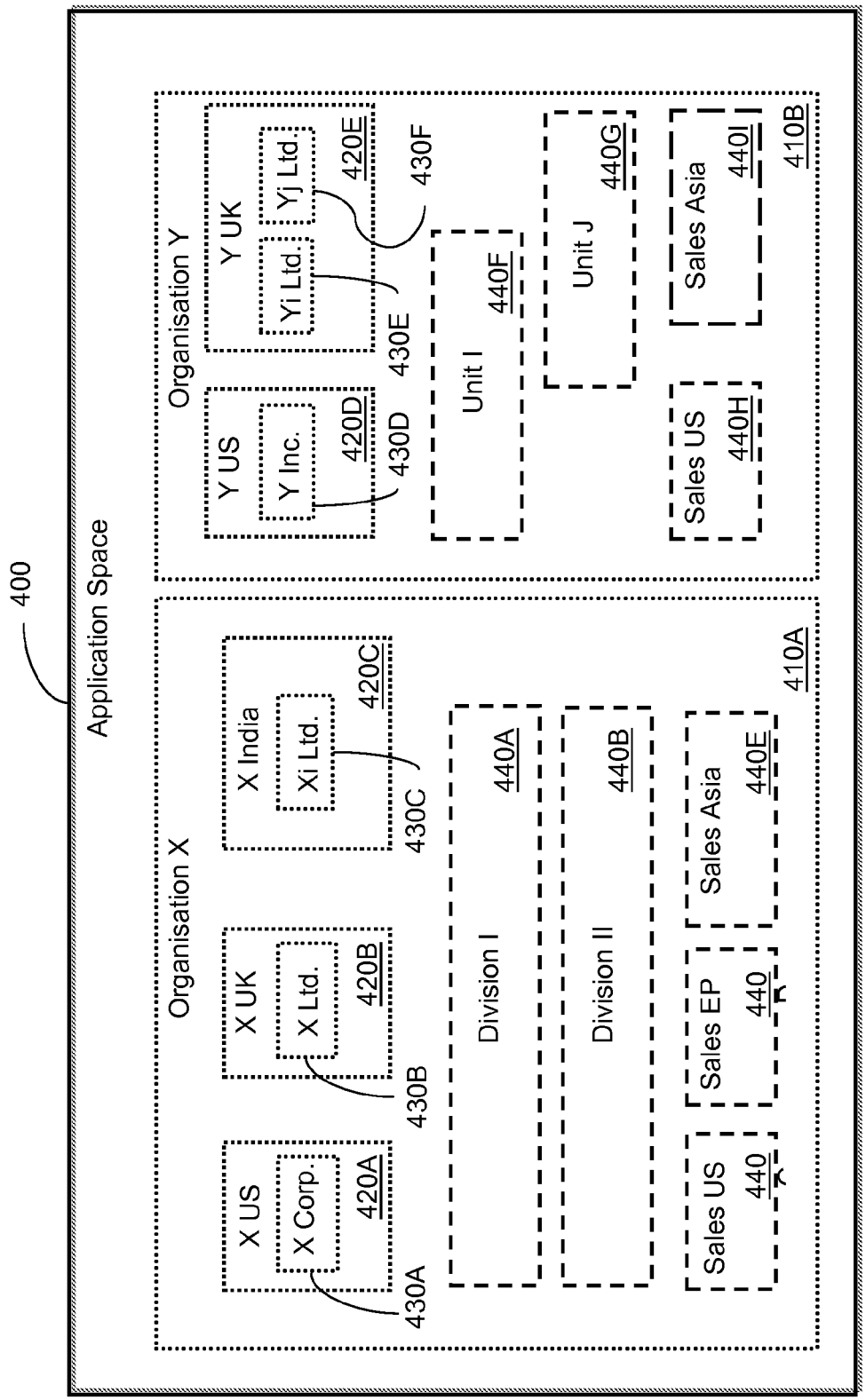
FIG. 4 schematically illustrates the division of an application according to a second embodiment of the present invention.

FIG. 4 illustrates a schematic division of an application 400 as implemented by application server 320. Application 400 may be any known application, such as an email application, a payroll application, a word-processing application, a customer relationship management (CRM) application etc. In the following description the term "instance" is used to signify a copy of the application that is loaded into memory and executed, when required, by a processor.

The application 400 is divided so that a different instance of the application is supplied to users of organisation X 410A and users of organisation Y 410B concurrently. Hence, users on client computers 360A and 360B will be presented with an application instance configured for organisation X 410A and the user of client computer 360C will be presented with an application instance configured for organisation Y 410B. This means that a user operating client computer 360A sees the application as if it is running purely for organisation X and a user operating client computer 360C sees the application as if it is running purely for organisation Y. In most circumstances a user will only use an application instance configured for their particular organisation and will not use a differently configured instance. In other embodiments the application 400 may only be provided to a single organisation.

As well as configuring the application instance presented to the user based on their organisation, the application 400 may be further configured to present a different application instance to users that belong to different departments or levels within an organisation 410. In a preferred embodiment, the configuration of an application instance is based on divisions that comprise a business unit, a legislative group and a legal entity.

Business units represent a logical unit of definition within an organisation. Typically, these may represent a "line of business" within an organisation; for example "production", "sales" and "support" may be business units within a company. For non-commercial organisations, business units may represent other logical units of division, such as the departments of a government or a university, or various arms of a charity. Each of these business units may conduct operations in multiple locations and may be spread across multiple legal companies; for example, a large global company may have support offices in several countries, wherein the employees of each of these may work for different legal employers within each country. In such a case, the application 400 may be configured accordingly; for example, if the application is a financial reporting system, a member of a business unit may use an appropriately configured instance 440 to perform calculations for that business unit on data related to a variety of legal entities and geographical regions.

A legislative group represents a division of an organisation that is associated with a particular geographical or regulatory region. For example, in FIG. 4, the application server 320 is configured to provide instances of the application to organisation X for legislative groups in the United States of America 420A, the United Kingdom 420B, and India 420C. Each legislative group may then be associated with one or more legal entities that operate within the associated geographical or regulatory region. For example, in FIG. 4, the application server 320 provides application instances configured for a limited company Xi Ltd. 430C that has a legal presence within a legislative group 420C comprising organisation X's operations. In a similar manner, an application instance 420E is provided for a legislative group representing organisation Y's operations in the UK. This instance may be further configured to provide instances associated with legal entities Yi Ltd. 430E and Yj Ltd. 430F, wherein each legal entity may be responsible for a certain section of organisation Y's activities.

The application server 320 determines the permissions allocated to each user when they log on to the application server 320. Preferably, a user logs on to the application server 320 by entering a user name and password. These details are then verified and/or validated by the application server 320 and the application instance is configured based on user profile data, such as their organisation and/or department. This process may use entity tables configured in a similar manner to the first embodiment. In other variations the method of accessing the application may be performed automatically by a software application making use of known application programme interfaces (APIs). In an alternate embodiment the Internet Protocol (IP) address is used instead of a user name and password to log on to the application server 320.

Each application instance will require access to data stored on database 330. Database 330 may be seen as an extension of database 100 described in the first embodiment. It is vital that data concerning organisation X is not accessible by members of organisation Y. However, this presents a problem as typically each application instance tailored for different users will use data stored upon a single database 330. Hence, the present invention presents a way to partition data on database 330 so as to provide this security and to only allow qualified users access to the appropriate data. To achieve this, the second embodiment of the present invention builds upon the first embodiment and presents a multilevel partitioning scheme that is applied to database 330. Such a partition scheme is illustrated schematically in FIG. 5.

Firstly, a plurality of "first partitions" and "second partitions", as described with relation to the first embodiment, are proposed and the partitioning structure is extended to include "third partitions", "fourth partitions" and "fifth partitions", i.e. to include a plurality of different levels of partitions. Optionally, these levels may be nested within each other to form a nested hierarchy of partitions, for example the third to fifth partitions existing within the context of the first partition. The terms "first", "second", "third", "fourth" and "fifth" have been used to describe an example of the invention and a person skilled in the art would realise that these terms may be used differently and/or interchanged without departing from the spirit and the scope of the invention. Within the example shown in FIG. 5, the first partitions represent organisations 510, and the second partitions represent regulatory regions 560. Data not assigned to any of these partitions is referred to as universal data 500.

Data forming the universal level 500 is accessible across all applications and is common to, or shared by, all users or tenants of the application. Such data will typically comprise system values or predefined values of an application; for example if the application instance comprises a payroll application, a defined set of temporal periods or a list of currencies.

Figure 5:
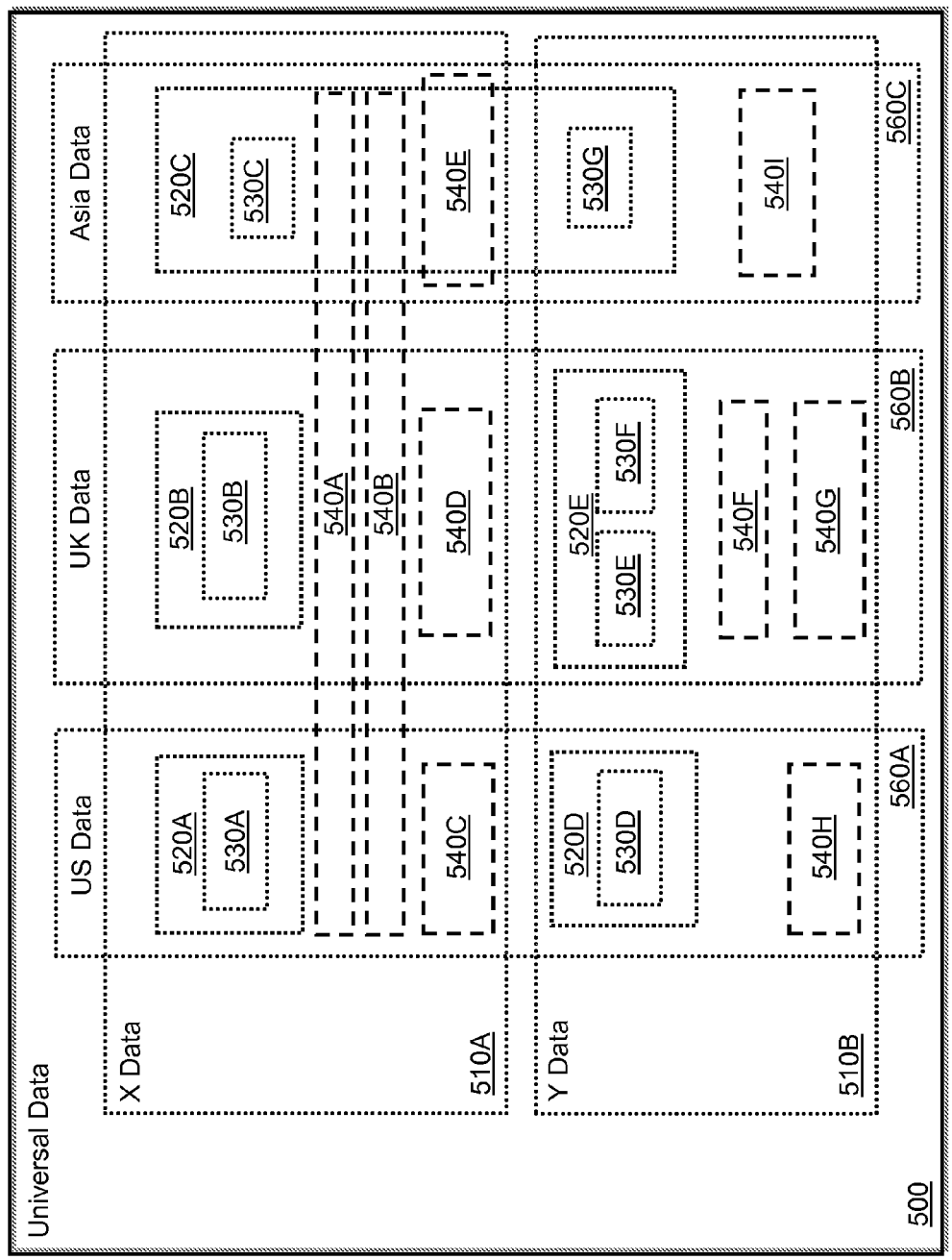
FIG. 5 schematically illustrates a set of data partitioned according to the second embodiment of the present invention.

In FIG. 5, there are two partitions at the first partition or organisational level: a partition 510A comprising data relating to organisation X and a partition 510B comprising data relating to organisation Y. A partition at this level is associated with a particular organisation, and data within each partition will be related to all organisation structures within the organisation, similar to the partition 110 in FIGS. 1A and 1B. Data assigned to a partition at the organisation level 510 is typically entered or "owned" by a particular organisation or users of the organisation.

Data may be assigned to an organisation partition using the FPP_VALUE (first partition parameter) column of a data table, as described with regard to the first embodiment. For example, the FPP_VALUE column in the data table may be renamed as an ORG_ID (organisation identifier) column, wherein an entry for each row of the table in this column identifies one assigned partition out of one or more organisation partitions. The second embodiment differs from the first embodiment in that the first partition parameter or equivalent may take a plurality of values to represent a plurality of possible first partitions. Data assigned to a particular partition at this level can only be accessed by users associated with a corresponding organisation and cannot be accessed by users associated to another organisation. The association of a user with an organisation may be based on the assignment of an entity to a first partition as described in the first embodiment; for example, the FPP_VALUE in the entity table may be renamed as an ORG_ID column, wherein an entry for each row of the table in this column identifies one assigned partition out of one or more organisation partitions. If data is solely assigned to a first organisation partition it may be accessed by any entity assigned to the same first organisation partition (plus any other second, third, fourth or fifth partition).

Data assigned to a partition at the second partition or regulatory region level 560 is accessible by a user or application allotted to a corresponding region. In FIG. 5 there are three partitions defined at the regulatory region level: US data 560A, UK data 560B, and Asian data 560C. Each partition defined at this level corresponds to a geographical region where there are specific laws and regulations that need to be addressed by a given application. For example, a region could comprise a country such as the US, a state within a country, such as California, or a union of countries such as the European Union. The second embodiment differs from the first embodiment in that the second partition parameter or equivalent may take a plurality of values to represent a plurality of possible second partitions.

Data may be assigned to a regulatory region partition using the SPP_VALUE (second partition parameter) column of a data table, as described with regard to the first embodiment. For example, the SPP_VALUE column in the data table may be renamed as an R_REG_ID (regulatory region identifier) column, wherein an entry for each row of the table in this column identifies one assigned partition out of one or more regulatory region partitions. Data assigned to one of these partitions could comprise a predefined set of tax calculations and statutory holidays for a particular region. Such data is typically only amended when an applicable law in a particular region changes. A user or application may be allotted to a corresponding region by configuration data associated with a user or application, for example by renaming the SPP_VALUE in the entity table of the first embodiment column as a regulatory region identifier (R_REG_ID) column, wherein an entry for each row of the table in this column identifies one assigned partition out of one or more regulatory region partitions. In an alternate implementation this could also be performed by evaluating the IP address of an associated client computer.

For example, if a user was operating a client computer 360 in the United States, the region assigned to the user would be looked up in an entity table and this would allow the user to access data assigned to the US data partition 560A. This may then allow the user to access region specific data related to an organisation, such as a social security or national insurance number resident in a partition similar to partition 120 in FIG. 1B. Additionally, a user assigned to the X data partition 510A and US data partition 560A would not be able to access data assigned to Y data partition 510B and US data partition 560A.

As well as the first and second partitions corresponding respectively to an organisation and a regulatory region, the second embodiment may also optionally make use of one or more further partitions or partition levels (e.g. a set of third partitions, a set of fourth partitions etc.). These additional sets of "partitions" or levels effectively enables a more granular level of partitioning and allows a data provider to secure data at a greater level of detail; furthermore by managing the intersection of the different sets or levels of partitions an application developer or database administrator has greater control over who (or what) accesses particular items of data.

In the present example shown in FIG. 5, a third partition is generated within a first partition (i.e. within the context of a given organisation), in a similar manner to the way in which partition 120 in FIG. 1A exists within partition 110. This third partition may represent a business unit. In the present case, a business unit must be assigned to an organisation and cannot exist in isolation (i.e. a data entry assigned to a third partition must also have an associated first partition parameter value, even if this association is generated through linking multiple tables). This form of partitions produces a nested hierarchy. In certain embodiments such a nested hierarchy may be policed using the fact that a user will log in to an application with an assigned organisation or first partition, and thus will only be able to view or access data assigned to the particular organisation or first partition (e.g. be shown data similar to that shown in Table 6). In FIG. 5 there are nine "third" partitions, 540A to 540I, defined at the business unit level.

In certain embodiments a set of fourth and/or fifth partitions may also be generated. The set of fourth partitions may represent a legislative group level 420 and the set of fifth partitions may represent a legal entity level 430. This then allows further partitioning at one or more additional levels.

In FIG. 5, partitions 520 correspond to partitions defined at the legislative group level 420 and each partition may be used to restrict data access relating to one of the correspondingly numbered example application instances tailored for legislative groups, 420A to 420E, shown in FIG. 4. In some embodiments two items of data (two data entries) may be assigned to a common fourth or legislative group partition but different first or organisation partitions as shown by partition 520C.

In FIG. 5 there are six partitions 530A to 530F defined as a fifth or legal entity partition. Data assigned to a fifth or legal entity partition may be used to restrict data access relating to one of the correspondingly numbered example application instances tailored for legal entity level 430 and is typically associated with a real-world legal entity. For example, partition 530F in FIG. 5 corresponds to legal entity Yj Limited 430F, as shown in FIG. 4. An example of data that is typically assigned to a fifth partition at the legal entity level is the rate of pay for a particular legal employer.

A method of implementing the partitioning of the second embodiment in database 330 will now be described. An example of a data table, similar to Table 1 is shown below:

TABLE 8

| PAY_ID | PAY_CALC |
|--------|----------|
| 100001 | =(A + B)/2 |
| 100999 | =(A + B)/2 − 0.5B |
| 710345 | =(A/B)*C |

In this state, such a data table represents universal data 500, wherein partition parameter values are assumed to be null if they are not defined. This data table may be adapted to implement the partitioning described above by adding two columns as shown in Table 9:

TABLE 9

| PAY_ID | PAY_CALC | ORG_ID | R_REG_ID |
|--------|----------|--------|----------|
| 100001 | =(A + B)/2 | null | US |
| 100999 | =(A + B)/2 − 0.5B | X | null |
| 710345 | =(A/B)*C | null | null |

In a preferred embodiment, the two columns are added to every data table within the database 330; however, the two columns do not need to be added to all tables, if data in a particular data table is only to be assigned to one of a first partition or a second partition then the other of the partition parameter columns may be omitted, wherein a null value for the omitted partition parameter will be implied by the system supervising access (e.g. application server 320). For example, a data table containing non-legislative data, such as employee age, would only require the organisation (ORG_ID) column. The organisation identifier (ORG_ID) is similar to the FPP_VALUE in Table 3 and the regulatory region identifier (R_REG_ID) is similar to the SPP_VALUE in Table 3.

The organisation identifier (ORG_ID), implements the first or organisational partitions and each entry in this column represents a distinct partition at this level. For example, the entry "X" in the ORG_ID column of the second row means that the data within this row is assigned to the "X data" partition 510A associated with organization X. The second column implements the second or regulatory region partitions and each distinct entry within this column represents a partition associated with a distinct regulatory region. For example, the entry "US", in the R_Reg_ID column of the first row in the above table, assigns the data in this row to the "US data" partition 560A. In certain embodiments, the regulatory region and organisational levels may be mutually exclusive, i.e. an entry in one column means that a "null" entry must be entered for the other column, and restriction of access to data intersections (such as the data shown as 130 in FIG. 1B) is implemented using modifications of the first embodiment configured to implement implicit assignments by joining multiple tables. In other embodiments of the present invention, data may be assigned to both a first partition and a second partition and thus entries may be present in both columns.

In a preferred embodiment of the present invention, each entry in the additional columns is chosen from a list of possible entries defined within the database 330, wherein each entry in the list sets out a particular first partition or second partition of the database. For example, a list of available second or regulatory region partitions may be defined as universal data using the table shown below, with each entry representing a particular partition:

TABLE 10

| R_REG_ID | REGION_NAME |
|---|---|
| GB | United Kingdom |
| CA_US | California |
| US | United States of America |

To implement the third, fourth and fifth partitions (i.e. the business unit, legislative group and legal entity partitions) one or more further columns may again be added to each data table within database 330 to represent third, fourth and fifth partition parameters, in a similar manner to the addition of columns to store the first and second partition parameters. In one variation of the second embodiment of the present invention a column is added for each partition to be implemented. An example of a data table adapted in this manner is shown below:

TABLE 11

| P_ID | P_NAME | ORG_ID | R_REG_ID | L_G_ID | L_E_ID | B_U_ID |
|---|---|---|---|---|---|---|
| 666 | John Thuringer | X | null | X UK | X Ltd | Division I |
| 777 | Simon Jones | Y | null | Y US | Y Ltd | Sales US |

In the above example, columns are added to implement third or business unit partitions (B_U_ID), fourth or legislative group partitions (L_G_ID), and fifth or legal entity partitions (L_E_ID). In this case, data may belong to none of these partitions or to one or more of the third, fourth and fifth partitions.

In an alternative or complementary variation of the second embodiment, the details of the third, fourth and fifth partitions may be defined in a general "additional partitions" table as shown below:

TABLE 12

| PARTITION_ID | NAME | TYPE | ORG_ID | R_REG_ID |
|---|---|---|---|---|
| 601 | X UK | LEGISLA- TIVE_GROUP | X | GB |
| 701 | Y US | LEGISLA- TIVE_GROUP | Y | US |

TABLE 12-continued

| PARTITION_ID | NAME | TYPE | ORG_ID | R_REG_ID |
|---|---|---|---|---|
| 801 | X Ltd | LEGAL_ENTITY | X | GB |
| 811 | Y Ltd | LEGAL_ENTITY | Y | US |
| 901 | Division I | BUSINESS_UNIT | X | null |
| 1001 | Sales US | BUSINESS_UNIT | Y | null |

In this example, a third, fourth or fifth partition is defined by a row or entry in Table 12 and identified by a partition identifier: PARTITION_ID. Whether the partition is a third, fourth or fifth partition (i.e. a business unit, legislative group or legal entity partition) is set by the type column: TYPE. For example, the second row of Table 12 defines a partition 701—"Y US", which is defined as a fourth or legislative group partition 520, and the fifth row of Table 12 defines a partition labelled 901—"Division I", which is defined as a third or business unit partition 540.

Data within a data table of the database 330 may then be assigned to a partition by adding one or more columns corresponding to that partition level (i.e. one or more columns corresponding to one of a business unit, legislative group or legal entity partition). For example, the data table below shows a tax calculation table for use in a payroll application, wherein each row is assigned to a particular legislative group partition by adding a column headed "L_G_ID", and each particular fourth partition is identified by the entry in this column.

TABLE 13

| TAX_ID | FORMULA_NAME | L_G_ID | FORMULA |
|---|---|---|---|
| 101 | GLOBAL_BONUS | null | =10/100*PAY |
| 102 | Y_US_TAX | 701 | =40/100*PAY |
| 201 | X_UK_PENSION | 601 | =5/100*PAY |

In this example, data in the second row of the table is assigned to the Y US legislative group partition 520 as defined in Table 12 and data in the third row of the table is assigned to the X UK legislative group partition 520 as also defined in Table 12. In this case, access to data assigned to multiple partitions of different levels or types (e.g. data similar to that shown in partition intersection regions such as 130 in FIG. 1B) is policed by the application server 320 in an extension of the process shown in FIGS. 2A and 2B, based on joining data from Table 12 and data from Table 13. In a similar manner the table below shows an adapted Table 11, wherein the names of each partition have been replaced by the identifiers (PARTITION_ID) defined in Table 12:

TABLE 14

| P_ID | P_NAME | ORG_ID | R_REG_ID | L_G_ID | L_E_ID | B_U_ID |
|------|--------|--------|----------|--------|--------|--------|
| 666 | John Thuringer | X | null | 601 | 801 | 901 |
| 777 | Simon Jones | Y | null | 701 | 811 | 1001 |

In yet a further alternative or complementary variation of the second embodiment the application or database developer may pick and choose the relevant partition parameter columns to add to each data table (or this may be performed automatically when data is created or modified). For example, the table below illustrates an example of a personnel table, wherein each member of personnel is assigned to a particular first or organisation partition by adding a column headed "ORG_ID", each entry within this column setting the partition to which the row is assigned, and each member is also assigned to a third or business unit partition by adding a column headed "B_U_ID", each entry within this column setting the partition to which the row is assigned.

TABLE 15

| PERSON_ID | PERSON_NAME | ORG_ID | B_U_ID |
|-----------|-------------|--------|--------|
| 666 | John Thuringer | X | 901 |
| 777 | Simon Jones | Y | 1001 |

Similar methods such as those described above may also be used to add one or more additional columns corresponding to the third, fourth and fifth partitions to an entity table that contains data corresponding to the entities requiring access to the database 330. Access to the database 330 may be controlled in a similar manner to that described with reference to FIGS. 2A and 2B of the first embodiment, wherein the method may be performed either by the application server 320 receiving requests from entities or by a dedicated database server (not shown) that receives requests from the application server 320 or application instances. In the latter case, each application instance may be defined as an entity in a similar manner to A_1 shown in Table 5.

The partitioning method described above overcomes limitations found with existing application systems that do not support partitioning for multi-level data or multi-tenancy databases. The present partitioning scheme provides a well defined, yet flexible solution fully supporting multi-tenancy and multi-national data, and also allows different or multiple levels of partitioning in different applications as part of the same installation or application instance. This then allows an application provider running an application server 320 to serve multiple customers using different sets of applications, by providing the separation of their data by organisation and/or other user-defined parameters. The methods and systems of both the first and second embodiments also allow users to further partition the data uniquely, based on customer specific requirements.

It is important to note that while the present invention has been described in a context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out distribution. Examples of computer readable media include recordable-type media such as floppy disks, a hard disk drive, RAM and CD-ROMs as well as transmission-type media such as digital and analogue communications links.

What is claimed is:

1. A method for partitioning a multi-tenant database between a plurality of tenants, the method comprising:
defining, by a computer system, a first level partition of data in a table within the database, the first level partition defined by a column of the table associated with the first level partition, each row of the column associated with the first level partition storing a first partition parameter value indicating whether data of the row of the table is assigned to the first level partition;
defining, by the computer system, a second level partition of the data in the table within the database, the second level partition defined by a column of the table associated with the second level partition, each row of the column associated with the second level partition storing a second partition parameter value indicating whether data of the row of the table is assigned to the second level partition;
receiving, by the computer system, a request from an entity associated with a tenant of the plurality of tenants to access a first datum stored in the database:
determining, by the computer system, whether the tenant with which the entity is associated is assigned to the first level partition, the second level partition, or both the first level partition and the second level partition, wherein the determining comprises identifying that a first tenant is uniquely assigned to the first level partition and/or a second tenant is uniquely assigned to the second level partition, wherein an assignment of the first level partition and an assignment of second level partition are mutually exclusive; and
granting, by the computer system, access to the first datum to:
a first entity where the tenant corresponds to the first tenant and the first datum corresponds to the first level partition parameter value for a row of the table in which the first datum is stored;
a second entity where the tenant corresponds to the second tenant and the first datum corresponds to the second level partition parameter value for the row of the table in which the first datum is stored.

2. The method of claim 1, wherein granting access to the first datum based on the first level partition parameter value and the second level partition parameter value for a row of the table in which the first data is stored comprises granting access to the first datum to the entity if the first datum is defined as exclusively assigned to the first level partition, the tenant with which the entity is associated is assigned to at least the first level partition, and the entity has security access for a first security type.

3. The method of claim 1, wherein granting access to the first datum based on the first level partition parameter value and the second level partition parameter value for a row of the table in which the first data is stored comprises granting access to the first datum to the entity if the first datum is defined as exclusively assigned to the second level partition, the tenant with which the entity is associated is assigned to at least the second level partition, and the entity is physically located within a first physical location.

4. The method of claim 1, wherein granting access to the first datum based on the first level partition parameter value and the second level partition parameter value for a row of the table in which the first data is stored comprises granting access to the first datum to the entity if the first datum is defined as assigned to both the first level partition and the second level partition, the tenant with which the entity is associated is assigned to both the first level partition and the second level partition, the entity has security access for a first security type, and the entity is physically located within a first physical location.

5. The method of claim 1, wherein the first level partition represents an organization.

6. The method of claim 5, wherein the second level partition represents one of a region, a legal grouping, a business unit, or a legal entity.

7. A system comprising:
a processor; and
a memory coupled with and readable by the processor and storing therein a set of instructions which, when executed by the processor, causes the processor to partition a multi-tenant database between a plurality of tenants by:
defining a first level partition of data in a table within the database, the first level partition defined by a column of the table associated with the first level partition, each row of the column associated with the first level partition storing a first partition parameter value indicating whether data of the row of the table is assigned to the first level partition;
defining a second level partition of the data in the table within the database, the second level partition defined by a column of the table associated with the second level partition, each row of the column associated with the second level partition storing a second partition parameter value indicating whether data of the row of the table is assigned to the second level partition;
receiving a request from an entity associated with a tenant of the plurality of tenants to access a first datum stored in the database;
determining whether the tenant with which the entity is associated is assigned to the first level partition, the second level partition, or both the first level partition and the second level partition, wherein the determining comprises identifying that a first tenant is uniquely assigned to the first level partition and/or a second tenant is uniquely assigned to the second level partition, wherein an assignment of the first level partition and an assignment of second level partition are mutually exclusive; and
granting access to the first datum to:
a first entity where the tenant corresponds to the first tenant and the first datum corresponds to the first level partition parameter value for a row of the table in which the first datum is stored;
a second entity where the tenant corresponds to the second tenant and the first datum corresponds to the second level partition parameter value for the row of the table in which the first datum is stored.

8. The system of claim 7, wherein granting access to the first datum based on the first level partition parameter value and the second level partition parameter value for a row of the table in which the first data is stored comprises granting access to the first datum to the entity if the first datum is defined as exclusively assigned to the first level partition, the tenant with which the entity is associated is assigned to at least the first level partition, and the entity has security access for a first security type.

9. The system of claim 7, wherein granting access to the first datum based on the first level partition parameter value and the second level partition parameter value for a row of the table in which the first data is stored comprises granting access to the first datum to the entity if the first datum is defined as exclusively assigned to the second level partition, the tenant with which the entity is associated is assigned to at least the second level partition, and the entity is physically located within a first physical location.

10. The system of claim 7, wherein granting access to the first datum based on the first level partition parameter value and the second level partition parameter value for a row of the table in which the first data is stored comprises granting access to the first datum to the entity if the first datum is defined as assigned to both the first level partition and the second level partition, the tenant with which the entity is associated is assigned to both the first level partition and the second level partition, the entity has security access for a first security type, and the entity is physically located within a first physical location.

11. The system of claim 10, wherein the first level partition represents an organization and the second level partition represents one of a region, a legal grouping, a business unit, or a legal entity.

12. A machine-readable memory comprising a set of instructions stored therein which, when executed by a processor, causes the processor to partition a multi-tenant database between a plurality of tenants by:
defining a first level partition of data in a table within the database, the first level partition defined by a column of the table associated with the first level partition, each row of the column associated with the first level partition storing a first partition parameter value indicating whether data of the row of the table is assigned to the first level partition;
defining a second level partition of the data in the table within the database, the second level partition defined by a column of the table associated with the second level partition, each row of the column associated with the second level partition storing a second partition parameter value indicating whether data of the row of the table is assigned to the second level partition;
receiving a request from an entity associated with a tenant of the plurality of tenants to access a first datum stored in the database;
determining whether the tenant with which the entity is associated is assigned to the first level partition, the second level partition, or both the first level partition and the second level partition, wherein the determining comprises identifying that a first tenant is uniquely assigned to the first level partition and/or a second tenant is uniquely assigned to the second level partition, wherein an assignment of the first level partition and an assignment of second level partition are mutually exclusive; and
granting access to the first datum to:
a first entity where the tenant corresponds to the first tenant and the first datum corresponds to the first level partition parameter value for a row of the table in which the first datum is stored;
a second entity where the tenant corresponds to the second tenant and the first datum corresponds to the second level partition parameter value for the row of the table in which the first datum is stored.

13. The machine-readable memory of claim 12, wherein granting access to the first datum based on the first level partition parameter value and the second level partition parameter value for a row of the table in which the first data is stored comprises granting access to the first datum to the entity if the first datum is defined as exclusively assigned to the first level partition, the tenant with which the entity is associated is assigned to at least the first level partition, and the entity has security access for a first security type.

14. The machine-readable memory of claim 12, wherein granting access to the first datum based on the first level partition parameter value and the second level partition parameter value for a row of the table in which the first data is stored comprises granting access to the first datum to the entity if the first datum is defined as exclusively assigned to the second level partition, the tenant with which the entity is associated is assigned to at least the second level partition, and the entity is physically located within a first physical location.

15. The machine-readable memory of claim 12, wherein granting access to the first datum based on the first level partition parameter value and the second level partition parameter value for a row of the table in which the first data is stored comprises granting access to the first datum to the entity if the first datum is defined as assigned to both the first level partition and the second level partition, the tenant with which the entity is associated is assigned to both the first level partition and the second level partition, the entity has security access for a first security type, and the entity is physically located within a first physical location.

16. The machine-readable memory of claim 12, wherein the first level partition represents an organization.

17. The machine-readable memory of claim 16, wherein the second level partition represents one of a region, a legal grouping, a business unit, or a legal entity.

* * * * *

UNITED STATES PATENT AND TRADEMARK OFFICE
CERTIFICATE OF CORRECTION

PATENT NO. : 9,489,407 B2
APPLICATION NO. : 14/168689
DATED : November 8, 2016
INVENTOR(S) : Thuringer et al.

It is certified that error appears in the above-identified patent and that said Letters Patent is hereby corrected as shown below:

In the Claims

In Column 18, Line 32, in Claim 1, delete "database:" and insert -- database; --, therefor.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*